(12) United States Patent
Skurkis et al.

(10) Patent No.: US 9,022,682 B2
(45) Date of Patent: May 5, 2015

(54) ACTIVE MATERIAL WIRE ACTUATORS HAVING REINFORCED STRUCTURAL CONNECTORS

(75) Inventors: Richard J. Skurkis, Lake Orion, MI (US); Paul W. Alexander, Ypsilanti, MI (US); Nicholas W Pinto, IV, Ferndale, MI (US); Xiujie Gao, Troy, MI (US); Nilesh D. Mankame, Ann Arbor, MI (US); Peter Maxwell Sarosi, Ferndale, MI (US); Robin Stevenson, Bloomfield, MI (US); Nancy L. Johnson, Northville, MI (US); Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 13/443,989

(22) Filed: Apr. 11, 2012

(65) Prior Publication Data

US 2012/0198835 A1     Aug. 9, 2012

Related U.S. Application Data

(63) Continuation-in-part of application No. 12/250,148, filed on Oct. 13, 2008, now abandoned.

(51) Int. Cl.
| | |
|---|---|
| *F16C 9/00* | (2006.01) |
| *F16G 11/02* | (2006.01) |
| *F03G 7/06* | (2006.01) |

(52) U.S. Cl.
CPC ............... *F16G 11/02* (2013.01); *F03G 7/065* (2013.01)

(58) Field of Classification Search
USPC ..................... 403/28–30, 274–285
See application file for complete search history.

(56) References Cited

U.S. PATENT DOCUMENTS

| | | | | |
|---|---|---|---|---|
| 4,991,602 | A * | 2/1991 | Amplatz et al. | 600/585 |
| 5,996,346 | A * | 12/1999 | Maynard | 60/527 |
| 6,574,958 | B1 * | 6/2003 | MacGregor | 60/527 |
| 6,641,593 | B1 * | 11/2003 | Schaller et al. | 606/157 |
| 7,188,473 | B1 * | 3/2007 | Asada et al. | 60/527 |
| 7,853,331 | B2 * | 12/2010 | Kaplan et al. | 607/99 |
| 2002/0113499 | A1 * | 8/2002 | von Behrens et al. | 310/12 |
| 2003/0195432 | A1 * | 10/2003 | Kortenbach et al. | 600/562 |
| 2003/0199974 | A1 * | 10/2003 | Lee et al. | 623/2.36 |
| 2004/0261411 | A1 * | 12/2004 | MacGregor | 60/527 |
| 2005/0065601 | A1 * | 3/2005 | Lee et al. | 623/2.36 |
| 2006/0201609 | A1 * | 9/2006 | Edwin et al. | 156/192 |
| 2006/0247618 | A1 * | 11/2006 | Kaplan et al. | 606/41 |
| 2006/0247619 | A1 * | 11/2006 | Kaplan et al. | 606/41 |
| 2008/0141736 | A1 * | 6/2008 | Jones et al. | 70/77 |
| 2009/0250952 | A1 * | 10/2009 | Niskanen et al. | 292/341.15 |
| 2009/0326637 | A1 * | 12/2009 | Hashimoto et al. | 623/1.15 |
| 2010/0152769 | A1 * | 6/2010 | Gesswein et al. | 606/200 |
| 2010/0293940 | A1 * | 11/2010 | Noda et al. | 60/527 |
| 2011/0004298 | A1 * | 1/2011 | Lee et al. | 623/2.11 |
| 2011/0168725 | A1 * | 7/2011 | Jacob | 220/573.1 |

* cited by examiner

*Primary Examiner* — Victor MacArthur

(57) ABSTRACT

An assembly for and method of reinforcing interconnection between an active material wire actuator, such as a shape memory alloy wire, and structure, includes the generation and engagement of an enlarged formation affixed to or integrally formed with the actuator.

19 Claims, 3 Drawing Sheets

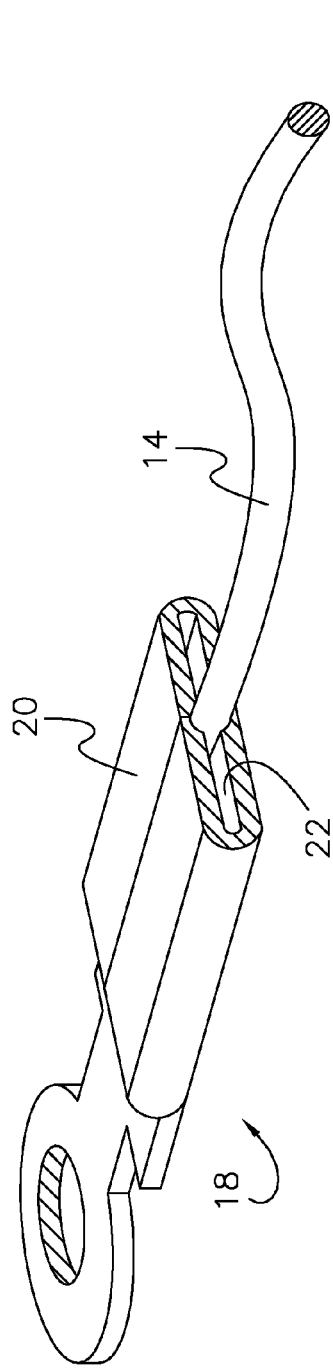
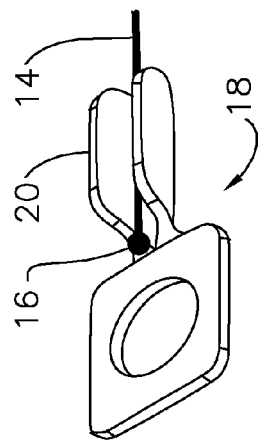
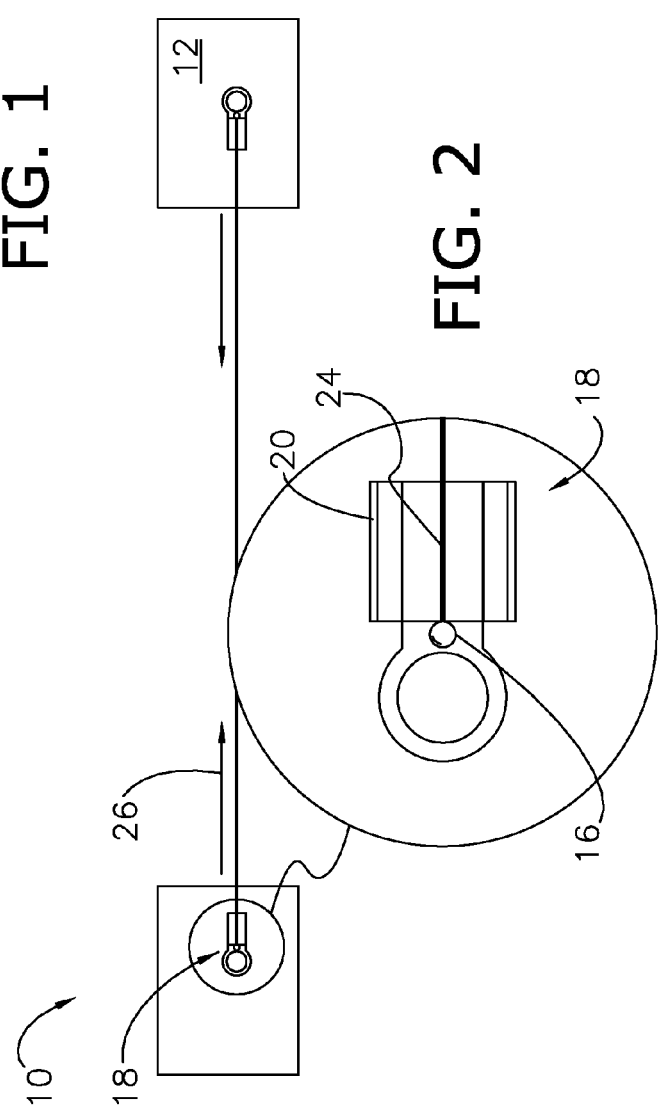
FIG. 1
FIG. 2
FIG. 2a

ACTIVE MATERIAL WIRE ACTUATORS HAVING REINFORCED STRUCTURAL CONNECTORS

RELATED APPLICATIONS

This patent application claims priority to, and continues-in-part from U.S. Non-provisional patent application Ser. No. 12/250,148, entitled "ACTIVE MATERIAL ELEMENTS HAVING REINFORCED STRUCTURAL CONNECTORS," filed on Oct. 13, 2008.

BACKGROUND OF THE INVENTION

1. Technical Field

The present invention relates to structural connectors and methods of reinforcing connection between structural members and active material wire actuators, and more particularly, to an assembly for and method of reinforcing connection that utilize the generation and engagement of an enlarged formation affixed to or formed within the actuator.

2. Background Art

Active material elements are conventionally utilized to effect reconfiguration and/or bias variance in structural assemblies, actuators or smart devices, when activated or deactivated. For example, shape memory alloy (SMA) wires are often used to transfer loads between and cause the displacements of structural members, upon activation. That is to say, once thermally activated, the crystal structure of the alloy reconfigures and in turn causes the wire to shrink; the actuating or reconfiguring force is transferred to the coupled members solely through their connection points. In promoting this function, it is appreciated that secure methods of joining (e.g., "connecting") these wires to the structural members play a vital role.

Among conventional methods of joining, an O-ring brass ring crimp connector without insulation holder (FIG. 1) is widely used. This method, however, presents various concerns in the art. For example, slippage of the crimped portion of the wire during overload conditions (e.g., inertia loads on start-up from a cold stop, mechanical overload in the absence of an overload protection system, etc.) is a commonly experienced mal condition. Such failure, in turn, may cause the malfunction of the actuator or driven device. Of further concern is inconsistency and variability, and therefore, the inability to accurately predict failure in a given actuator. That is to say, it is appreciated by those of ordinary skill in the art that individual connections exhibit inconsistent load capacity as they undergo normal wear and tear (e.g., fatigue) over life, while the various conventional connectors exhibit differing capacities based on structural configuration.

Thus, for these reasons and more, there remains a need in the art for an improved method of joining active material elements, such as a shape memory wire, to structural members that increases structural capacity, and reduces the likelihood of premature failure.

BRIEF SUMMARY

The present invention concerns an improved method of joining an active material actuator to a structure that addresses the afore-mentioned concerns. The inventive assembly is useful for deterring failure at connection points, while providing a cost effective and readily implemented solution. In general, the invention utilizes a reinforcing connector coupled to and an enlarged formation affixed to or formed within an active material actuator to add structural capacity, increase durability and reliability, and therefore, improve actuator performance. The invention is further useful for reducing the force needed for crimping and therefore, for reducing stress concentrations in the wire. In a preferred embodiment, the invention is useful for offering a non-crimping method of connection that reduces the potential for damaging the wire during crimping, increases the active wire length for a given package size, and results in a pinned versus fixed end condition that further reduces stress within the wire.

Thus, the present invention provides an improved assembly and/or method of connection that offers plural advantages over conventional wire actuator connectors. In at least one observation, where a shape memory alloy wire having a maximum working force of 5.782 N was employed, conventional crimping connection presented a maximum load capacity of approximately 15 N, while the proposed joining process of the present invention yielded a maximum load capacity of approximately 30 N. Finally, in addition to higher static failure loads, the invention is yet further useful for providing a more consistently failing (i.e., predictable) connection that is based on the mechanics of the enlarged formation as opposed to the configuration or usage/life of the connector.

In general, the invention recites an active material actuator drivenly affixed to a structure, selectively producing a driving force, and operable to sustain an increased load over a predetermined period. The actuator includes at least one active material wire presenting a maximum lateral dimension, and operable to undergo a reversible change in fundamental property when exposed to or occluded from a signal. The actuator further includes an enlarged formation affixed to or integral with the wire and presenting a second lateral dimension greater than the maximum lateral dimension of the wire. Finally, at least one connector is fixedly connectable to the structure, and coupled to the wire, so as to be configured to engage the formation when the force is produced and the connector is connected to the structure. The wire(s) and connector are cooperatively configured to sustain the increased load over the period as a result of engaging the formation, wherein engaging the formation is caused or enhanced by the second lateral dimension.

As such, a second aspect of the invention involves a method of reinforcing a connection point defined by a structure and an active material actuator wire, wherein the wire presents a maximum lateral dimension and produces a driving force that counteracts at the point. The method comprises affixing a reinforcing connector to the structure, such that the connector is able to transfer the force to the structure. The wire is coupled to the connector, so as to define the point, and an enlarged formation attached to the wire is generated, such that the formation presents a second lateral dimension greater than the maximum dimension of the wire. By engaging the formation with the connector when the force is produced, a hold or pull through strength operable to transfer the force to the connector is presented.

Other aspects and advantages of the present invention, including methods of producing and exemplary configurations of the enlarged formation will be apparent from the following detailed description of the preferred embodiment(s) and the accompanying drawing figures.

BRIEF DESCRIPTION OF THE DRAWINGS

A preferred embodiment(s) of the invention is described in detail below with reference to the attached drawing figures of exemplary scale, wherein:

FIG. 1 is a perspective view of a prior art active material actuator comprising a shape memory wire and O-ring crimp reinforcement connector;

FIG. 2 is an elevation of an active material actuator comprising a shape memory wire, reinforcement connector, and further in caption view, an enlarged formation affixed to a distal end of the wire, in accordance with a preferred embodiment of the invention;

FIG. 2a is a perspective view of an O-ring crimp reinforcement connector illustrating open flaps prior to crimping, and a shape memory wire having a distal enlarged formation and disposed between the flaps, in accordance with a preferred embodiment of the invention;

DETAILED DESCRIPTION

Figure 3:
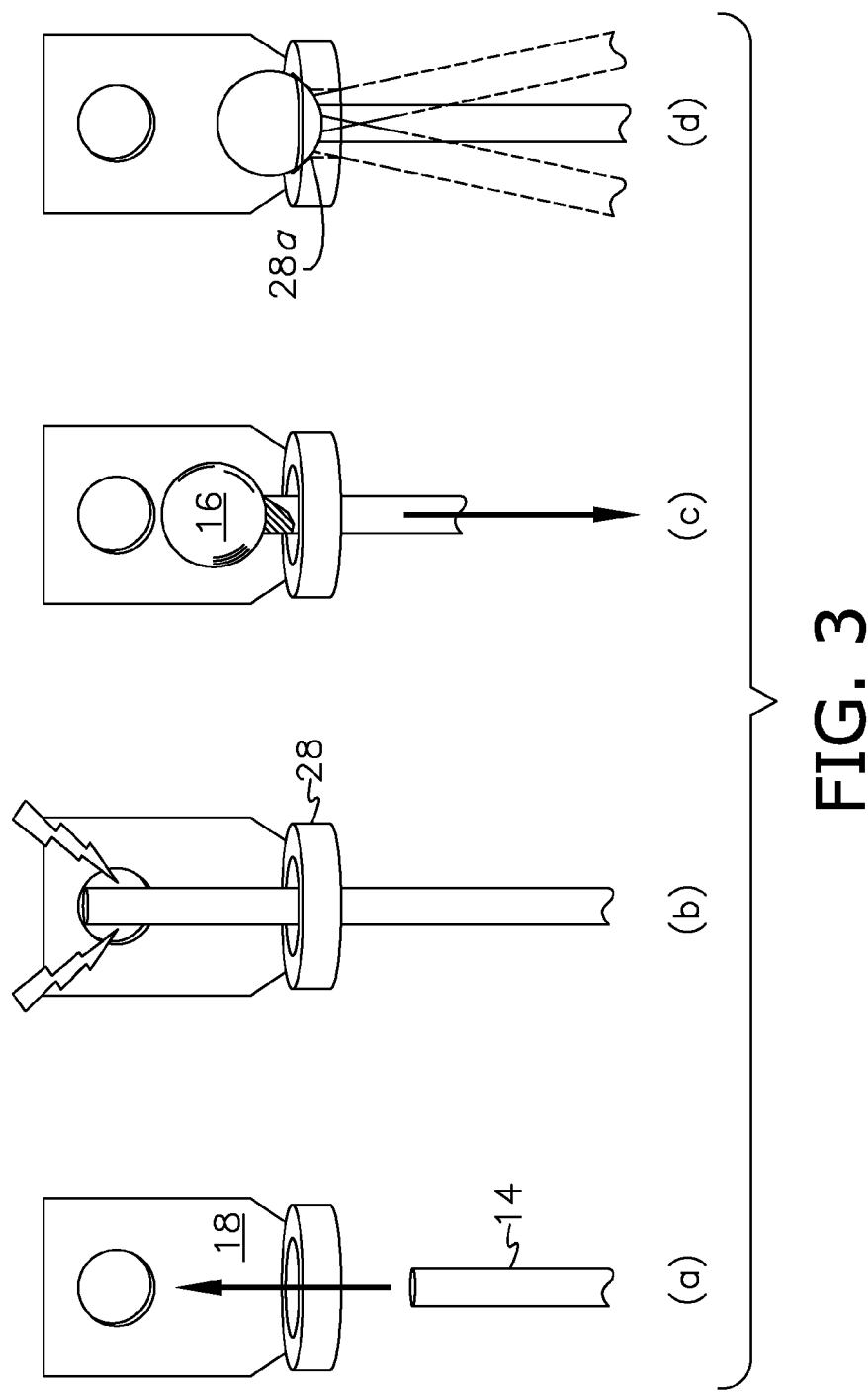
FIGS. 3a-d present a progression illustrating a preferred mode of assembling an active material actuator comprising at least one shape memory wire, reinforcement connector, and an enlarged formation distally generated, in accordance with a preferred embodiment of the invention.

With reference to FIGS. 1-8b, the present disclosure concerns an assembly 10 comprising a structure 12 and an inventive active material actuator 14 drivenly connected to the structure 12. As used herein the term "structure" shall mean any body, or interconnected multi-part embodiment whose function includes generating, transferring or sustaining a load, including an anchoring base and/or the driven device or component. Inventively, the actuator 14 is configured and a method of interconnecting the actuator 14 to the structure 12 is therefore presented to increase the structural capacity of the connection through selective or constant engagement of an enlarged formation 16. That is to say, through engagement with a formation 16 having a lateral dimension substantially greater than that of the actuator 14, wherein said engagement is caused or enhanced by the greater dimension, the structural capacity of an otherwise conventional connection is increased and/or the nature of failure is transformed. The enlarged formation 16 may be presented by any structural modification or addition to the wire 14 that results in a substantial increase in lateral dimension, including knots, weld beads, bends, bumps, and flattened sections. The following description of the preferred embodiments is merely exemplary in nature and is in no way intended to limit the invention, its application, or uses.

The term "active material" is understood by those of ordinary skill in the art to include any material or composite that exhibits a reversible change in fundamental (i.e., chemical or intrinsic physical) property when exposed to or precluded from an activation signal. Suitable active materials for use with the present invention shape memory materials that have the ability to remember at least one attribute such as shape, which can subsequently be recalled by applying an external stimulus. As such, deformation from the original shape is a temporary condition. In this manner, shape memory materials can change to the trained shape in response to an activation signal, thereby doing work. Exemplary shape memory materials include shape memory alloys (SMA), shape memory polymers (SMP), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, and return, if not under stress, to their shape prior to the deformation.

Shape memory alloys exist in several different temperature-dependent phases. The most commonly utilized of these phases are Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Thus, a suitable activation signal for use with shape memory alloys is a thermal activation signal having a magnitude sufficient to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite phase transformation, and the material will recover the original, annealed shape. Hence, one-way shape memory effects are only observed upon heating. Active materials comprising shape memory alloy compositions that exhibit one-way memory effects do not automatically cycle with temperature changes back and forth between two shapes, and require an external mechanical force to deform the shape away from its memorized or taught geometry.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their phase transition temperature. It is appreciated that where the SMA is one-way in operation, a biasing force return mechanism (such as a spring) would be required to return the SMA to its starting configuration.

In the Austenite phase, stress induced phase changes in SMA exhibits a superelastic (or pseudoelastic) behavior that refers to the ability of SMA to return to its original shape upon unloading after a substantial deformation in a two-way manner. That is to say, application of increasing stress when SMA is in its Austenitic phase will cause the SMA to exhibit elastic Austenitic behavior until a certain point where it is caused to change to its lower modulus Martensitic phase where it can exhibit up to 8% of superelastic deformation. Removal of the applied stress will cause the SMA to switch back to its Austenitic phase in so doing recovering its starting shape and higher modulus, as well as dissipating energy under the hysteretic loading/unloading stress-strain loop. Moreover, the application of an externally applied stress causes martensite to form at temperatures higher than $M_s$. Superelastic SMA can be strained several times more than ordinary metal alloys without being plastically deformed, however, this is only observed over a specific temperature range, with the largest ability to recover occurring close to $A_f$.

It is appreciated that Joule heating can be used to make the entire system electronically controllable. In this configuration, an activation signal source (not shown) is operably coupled to the actuator 14 and configured to selectively (e.g., manually or in response to sensory technology) generate an activation signal. As appreciated by those of ordinary skill in the art, the activation signal may be thermal, magnetic, electrical, chemical, and/or other like activation signal or a combination of activation signals depending upon the active material used. The source, for example, may be the charging system of a vehicle (also not shown).

The inventive actuator 14 generally includes at least one reinforcing connector 18 (FIGS. 1-8b) that defines the connection point to the structure 12, and adds mechanical strength and stress relief to the assembly 10. As shown in FIG. 2, opposite connectors 18 may be fixedly attached to each distal end of a shape memory wire actuator 14, wherein the term "wire" includes other tensile configurations, such as braids, strips, strands, cables, chains, sheets, and the like. The connector 18 is structurally configured to inherently withstand anticipatory loadings and overloads over an actuation period without failure. As such, the connector 18 is formed of a durable material having sufficient (tensile, torsional, shearing, etc.) strength to sustain the load, and a suitable manner of affixation to the structure 12 (e.g., fastening, welding, bonding, etc.) is provided. Where joule heating is applied, the connector 18 is preferably configured to electrically isolate the actuator 14 from the structure 12 and/or nearby metal surfaces.

For example, the connector 18 may present an O-ring crimp conventionally configured except as modified below. That is to say, the connector 18 may present an O-shaped head portion 18 operable to receive a bolt, screw, pin or other fastener, and a crimping section comprising opposite butterfly walls or flaps 20 (FIG. 1-2a). As appreciated, the walls 20 are foldable, through a crimping process, so as to define a generally enclosed space 22. The crimp 18 may be attached by using a hand tool, terminal crimping tool, hydraulic press, or other means. It is appreciated that the connector 18 may be configured to contemporaneously apply holding forces through conventional crimping, and through the application of the inventive enlarged formation 16 further described herein, such that a smaller connector 18 may be utilized.

In a preferred embodiment, the space 22 is configured to compress and define a holding strength at a crimped section 24 of the actuator placed therein (FIGS. 1-2a). Here, the holding strength is conventionally used to interconnect the actuator 14 and structure 12, such that the benefits and aspects of the present invention described below are employed only during an overload failure. That is to say, the enlarged formation 16 engages the connector 18 only when the crimped section slips. Alternatively, in lieu of or addition to butterfly walls 20, crimping may be accomplished by flattening one or more tubes entraining, or wafers sandwiching the wire(s) 14.

Figure 7:
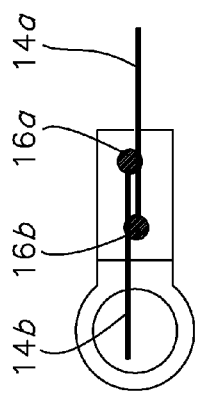
FIG. 7 is an elevation of an active material actuator comprising at least one shape memory wire, reinforcement connector, and an enlarged formation intermediately affixed to a singular wire or forming a butt-to-butt joint between two wires, in accordance with a preferred embodiment of the invention.

The formation 16 may be joined to the wire 14 by fastening, bonding, casting, welding, etc., or integrally present a homogenous body therewith. The bead 16 may be formed at a distal end of the wire 14 (FIGS. 2-3), or at a longitudinally interior point (FIG. 7). As shown in FIGS. 2-5, however, the preferred enlarged formation 16 is a welded bead affixed to and more preferably formed within the wire 14, wherein the term "welded bead" more specifically describes a portion of the wire 14 that has been melted, reshaped by surface tension, and then re-solidified to form a ball-like feature. A welded bead 16 may be formed by available conventional means, and is particularly suited for generation through the proper use of a micro-pulse arc welder. That is to say, the weld bead 16 may be formed using a conventional microwelder having settings suitable, for example, to supply, as an electric arc, about 6 watts of power to a 0.02 cm (i.e., 0.008 inch) diameter SMA wire over a period of about 2 milliseconds. In a preferred setup, a Tungsten electrode having a 0.5 mm diameter is preferably used in the stylus to form the bead 16. The finished bead 16 preferably presents a diameter at least twice, and more preferably, at least thrice the maximum lateral dimension (e.g., diameter) of the wire 14, so that the bead 16 is unable to pass through the space 22, even when the wire 14 is able to slip through. For example, for a cylindrical shape memory alloy wire having a constant diameter of 0.02 cm, a bead 16 having a maximum outside diameter not less than 0.04 cm (i.e., 0.016 inches) is preferably employed. Lastly, it is appreciated that the welding process anneals the bead 16 removing its shape memorization properties and therefore, its ability to contract in response to temperature change.

Where a weld pool is generated to form the bead 16, extraneous material may be added to produce a desired effect, as appreciated by those of ordinary skill in the art. For example, where the actuator 14 comprises a first shape memory alloy, a second shape memory alloy having a lower transformation temperature than the first may be added to the bead 16, so as to cause the bead 16 to transform to its higher modulus or Austenitic phase prior to the transformation or activation of the wire 14. More particularly, where the wire 14 presents an activation start temperature, the formation 16 is formed at least in part by a shape memory alloy having an activation end temperature less than the activation start temperature of the wire 14, such that the formation 16 is thermally activated prior to the wire 14. As a result, resistance to pull through (i.e., "pull-through strength") is passively enhanced when needed most.

In FIG. 2, a distal spherical bead 16 is presented adjacent the crimped portion 24 of the wire 14 opposite the centroid of the wire 14, wherein it is appreciated that when activated, a driving force 26 having a radially inward vector (away from the bead 16) is produced. Where the O-ring crimp 18, either through fatigue, damage, or improper assembly, is unable to apply a frictional holding force to the portion 24 necessary to counteract the driving force 26, the bead 16 will be caused to engage the folded walls 22. In doing so, the bead 16 acts as an emergency stop that enables the actuator 14 to continue to function. It is appreciated that the pull-through strength provided by the bead 16 derives from the compressive and shear strengths of its constituent material, and more particularly, from the geometry (relative to the space 22) and constituency of the bead 16, which remain constant and predictable over time. It is appreciated that where the maximum lateral dimension of the bead 16 is substantially (e.g., at least 50%) greater than that of the space 22 through which it must pass for complete failure, the pull-through strength offered by the bead 16 is substantially greater than the hold strength offered by conventional crimping.

It is certainly within the ambit of the invention to omit the crimping component (e.g., butterfly walls 20) of the connector 18 in lieu of a retention ring 28 entraining the wire 14 (FIG. 3a-d). In this configuration, the bead 16 applies the pull-through strength of the connection throughout normal operation by selectively engaging the ring 28. The preferred ring 28 offers chamfered or filleted edges 28a (FIG. 3d) so as to more uniformly transfer the driving force 26 and reduce cutting/shearing when engaging the bead 16. It is appreciated that allowances within the assembly 10 must be made to ensure that the bead 16 is seated within the ring 28 where responsive actuation is desired, so as to avoid delay. That is to say, slack and/or backlash within the assembly 10 should be removed prior to activation, for example, by pre-straining the wire 14. Once seated, however, it is also appreciated that the ball-and-socket configuration offers an improved range of motion to the actuator (FIG. 3d) that reduces the likelihood of a stress fracture break at the connection.

Figure 4:
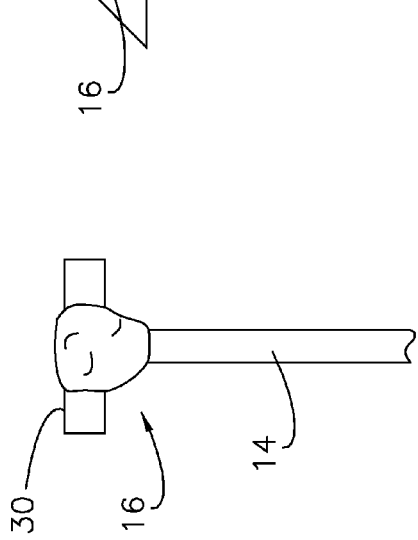
FIG. 4 is an elevation of an enlarged formation formed at the distal end of a shape memory wire, wherein the formation further includes an extraneous segment traversing the wire, in accordance with a preferred embodiment of the invention.
Figure 5:
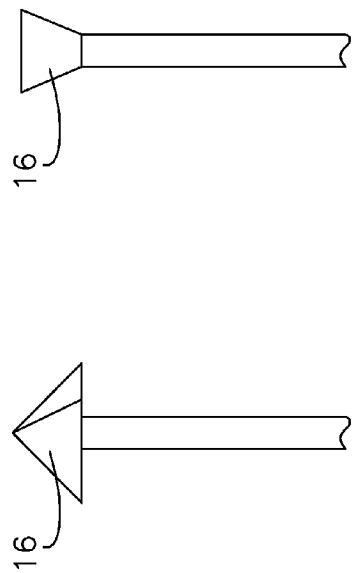
FIG. 5 is an elevation of an enlarged formation formed at the distal end of a shape memory wire, wherein the formation has been pressed into a conical configuration, in accordance with a preferred embodiment of the invention.

As shown in FIGS. 3a-d, a preferred method of constructing the assembly 10 includes a first step of affixing the connector 18 to the structure 12 using suitable means. Next, a conventional wire actuator 14 is partially placed within or passed through the space 22 or ring 28 (FIG. 3a). At a predetermined distance, the wire 14 is engaged by a micro-pulse arc welder, so as to form a weld bead 16 distally or at a longitudinally interior point (FIG. 3b). It is appreciated that the wire 14 is shortened as a result of material being used to form the bead 16. The wire 14 and bead 16 are then pulled into a seated position with the ring 28 or adjacent the space 22, where it is free to rotate and swing (FIGS. 3c-d). It is appreciated that the contoured ring 28 constrains the wire 14 only in the direction of a tensile load, allowing the SMA wire to move/pivot in the opposite/perpendicular directions during actuation. It is also appreciated that the additional degrees of freedom offered by this connection reduces stress levels by providing a pinned, as opposed to a fixed end condition. In an alternative mode of construction, the wire 14 may be prefabricated to include the enlarged formation 16, and caused to pass through the space 22 or ring 28 from the opposite end.

Where pivoting is not desired, the preferred formation 16 is geometrically configured to further increase the pull through strength of the connection, by defining an engaging surface orthogonally oriented relative to the driving force 26. The surface is of sufficient dimension (e.g., length, area, etc.) to traverse or overlay the ring 28 or space 22. In a first example, the formation 16 may further include a short, rigid segment or bar 30 that traverses the wire 14 (FIG. 4). The short segment 30 may be welded to the wire 14 during the pulse-arc welding process, and preferably presents a higher modulus than that of the wire 14. Where actuation is thermally driven, the preferred short segment 30 further presents a higher melting temperature than the wire 14. As a result, the mechanical resistance to pull through is increased. Alternatively, the formation 16 may define a molded shape that features the orthogonally engaging surface. For example, where a weld pool is produced a non-stick mold may be used to press the bead 16 into a conical or pyramid shape (FIG. 5), wherein the base of the formed bead 16 presents a wider diameter than the maximum lateral dimension of the space 22 or the inside diameter of the ring 28. Here, when the formation 16 is caused to engage the connector 18, the cone or pyramid will orthogonally engage the ring 28 in a flush manner that maximizes force transfer. In a preferred embodiment, the enhanced shape (e.g., conical, pyramid, etc.) is memorized by the shape memory alloy wire 14, such that activation of the actuator 14 further produces the enlarged formation 16.

Figure 6:
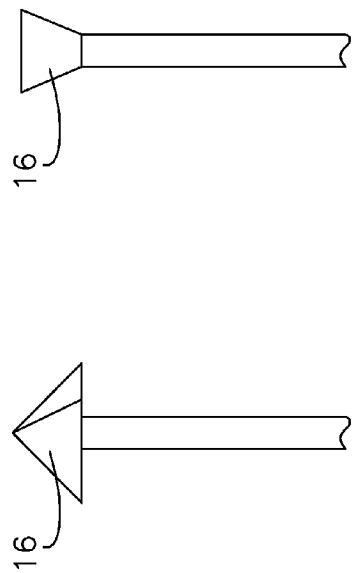
FIG. 6 is an elevation of an enlarged formation formed at the distal end of a shape memory wire, wherein the formation has been generated by flattening a distal portion of the wire, in accordance with a preferred embodiment of the invention.

Lastly, it is appreciated that generation of the formation 16 is not limited to a welding process. For example, the wire 14 may be manually flattened to produce a section having a wider maximum lateral dimension than the remainder of the wire 14, without producing a weld pool. FIG. 6 shows a wire actuator 14 having a flattened distal end.

Figure 8A:
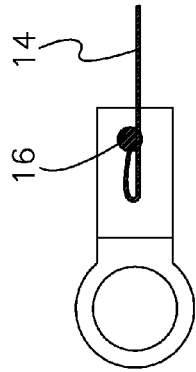
FIG. 8a is an elevation of an active material actuator comprising two shape memory wire, reinforcement connector, and enlarged formations intermediately and distally affixed to opposite wires so as to form a loop-to-loop joint, in accordance with a preferred embodiment of the invention.
Figure 8B:
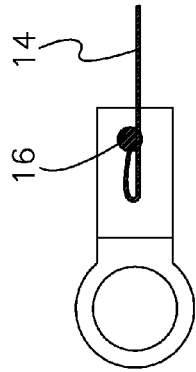
FIG. 8b is an elevation of an active material actuator comprising at least one shape memory wire, reinforcement connector, and an enlarged formation intermediately and distally affixed to a singular wire so as to form a loop joint, in accordance with a preferred embodiment of the invention.

In another aspect of the invention, the enlarged formation 16 may compose the crimped section 24 of the actuator 14, so as to increase the surface area of engagement and mechanical interference between the actuator 14 and connector 18 (FIGS. 7-8b). It is appreciated that this configuration is particularly applicable for wire actuators having smaller (e.g., less than 0.020 cm) diameters, due to experienced difficulties in crimping. In the illustrated embodiment shown in FIGS. 7-8b, the formation 16 is placed within the space 22, so that the walls 20 of the O-ring crimp 18 engage the formation 16 when folded over. This increases the hold strength applied to the crimped section 24. Again, the formation 16 may be formed distally or at an interior location along the longitudinal profile of the wire 14. With respect to the latter, it is appreciated that having an exposed distal portion of the wire 14 adjacent the crimped section 24 facilitates proper alignment and placement. Moreover, it is appreciated that the larger size of the formation 16 facilitates the assembly process by reducing the precision necessary to engage the wire 14. In this configuration, the formation 16 is constantly engaged by the connector 18; though subject to the same fatigue and variable slippage conditions as is conventionally appreciated, the increased surface area results in a stronger and more robust connection.

As alternatively shown in FIG. 7, it is within the ambit of the invention for the enlarged formation 16 to be a welded joint connecting first and second wires 14a,b end-to-end (i.e., a butt-to-butt joint). Here, the assembly 10 serves two purposes: forming a stronger joint between adjacent wires 14a,b (i.e., reducing the required tensile capacity of the joint), and effecting a stronger connection to a common structure 12. Moreover, it is appreciated that a loop-to-loop joint may be produced by overlapping distal portions of the wires 14a,b, so as to further increase the surface area of engagement and hold strength. First and second enlarged formations 16a,b may be formed by welding the distal end of the first wire 14a to an interior point along the profile of the second wire 14b, and vice versa (FIG. 8a). In FIG. 8b, a loop joint is similarly shown and functional, wherein a singular wire 14 has been doubled over. The formation 16 connects the distal end of the wire 14 to an interior point along the profile of the wire 14. It is appreciated that the loop or loop-to-loop joint may extend outside of the crimped section 24 on either or both sides of the walls 20.

This invention has been described with reference to exemplary embodiments; it will be understood by those skilled in the art that various changes may be made and equivalents may be substituted for elements thereof without departing from the scope of the invention. For example, though described and illustrated with reference to a crimp connector 18, it is appreciated that the hold strength may be provided through other means, such as epoxy, etc., wherein the provisions of the present invention are used to enhance the strength. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The terms "a" and "an" herein do not denote a limitation of quantity, but rather denote the presence of at least one of the referenced item. The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

What is claimed is:

1. An active material actuator drivenly engaged to a structure, selectively producing a driving force, and operable to sustain an increased load, said actuator comprising:
    at least one active material wire presenting a maximum lateral dimension, and operable to undergo a reversible change in fundamental property when exposed to or occluded from a signal;
    an enlarged formation affixed to or integrally formed with the wire, and presenting a second lateral dimension greater than the maximum dimension; and
    at least one connector fixedly connectable to the structure, coupled to the wire, and configured to physically engage the formation when the force is produced and the connector is connected to the structure, so as to fix said at least one wire relative to the structure;
    said at least one wire and connector being cooperatively configured to sustain the increased load as a result of engaging the formation, wherein engaging the formation is caused or enhanced by the second lateral dimension;
    wherein the wire presents an activated modulus, and the formation is formed at least in part by a material presenting a second modulus greater than the activated modulus.

2. The actuator as claimed in claim 1, wherein the wire is formed of a shape memory alloy.

3. The actuator as claimed in claim 1, wherein the wire presents a melting temperature, and the formation is formed at least in part by a material presenting a second melting temperature greater than the wire melting temperature.

4. The actuator as claimed in claim 1, wherein the second lateral dimension is greater than twice the maximum dimension of the wire.

5. The actuator as claimed in claim 1, wherein the connector defines an interior space having a third lateral dimension greater than the first and less than the second dimension.

6. The actuator as claimed in claim 1, wherein the connector includes foldable walls operable to define a generally enclosed space, the formation is inserted within the space, and the walls are flattened against the formation, so as to increase the surface area of engagement.

7. The actuator as claimed in claim 1, wherein a plurality of wires cooperatively define the formation.

8. The actuator as claimed in claim 1, wherein the wire defines distal ends, and the formation is spaced from the ends.

9. The actuator as claimed in claim 1, wherein the wire defines a distal loop and the formation closes the loop.

10. The actuator as claimed in claim 1, wherein the connector is an O-ring crimp, and the formation is a welded bead formed by a micro-pulse arc welder.

11. The actuator as claimed in claim 1, wherein the connector includes a contoured ring, the formation defines a welded bead, and the ring and bead cooperatively present a ball and socket connection.

12. The actuator as claimed in claim 1, wherein the formation is a flattened section of the wire.

13. The actuator as claimed in claim 12, wherein the formation and wire present a homogenous body.

14. The actuator as claimed in claim 1, wherein the formation and connector cooperatively present a pull-through strength, and the formation presents an orthogonal surface of engagement with the connector, so as to increase the pull-through strength.

15. An active material actuator drivenly engaged to a structure, selectively producing a driving force, and operable to sustain an increased load, said actuator comprising:

at least one active material wire formed of a shape memory alloy and presenting a maximum lateral dimension, and operable to undergo a reversible change in fundamental property when exposed to or occluded from a signal;

an enlarged formation affixed to or integrally formed with the wire, and presenting a second lateral dimension greater than the maximum dimension; and at least one connector fixedly connectable to the structure, coupled to the wire, and configured to physically engage the formation when the force is produced and the connector is connected to the structure, so as to fix said at least one wire relative to the structure;

said at least one wire and connector being cooperatively configured to sustain the increased load as a result of engaging the formation, wherein engaging the formation is caused or enhanced by the second lateral dimension;

wherein the wire presents an activation start temperature, and the formation is formed at least in part by a shape memory alloy having an activation end temperature less than the activation start temperature of the wire, such that the formation is thermally activated prior to the wire.

16. A method of reinforcing a connection point defined by the structure and the active material actuator of claim 1, wherein the at least one active material wire produces a driving force that acts at the point, said method comprising:

a. engaging the connector to the structure, such that the connector is able to transfer the driving force to the structure;

b. coupling the wire to the connector, so as to define the point;

c. generating the enlarged formation affixed to or integrally formed with the wire; and d. engaging the formation with the connector when the force is produced, so as to present a pull-through or hold strength operable to transfer the force to the connector.

17. The method as claimed in claim 16, wherein step c) further includes the steps of engaging the wire with a micropulse arc welder, so as to generate the formation.

18. The method as claimed in claim 16, wherein step c) precedes and enables step b).

19. The method as claimed in claim 16, wherein step c) further includes the steps of exposing the wire to an activation signal and generating the enlarged formation as a result of exposing the wire to the signal.

* * * * *